(No Model.)
S. FORRESTER.
CALF WEANER.
No. 309,843. Patented Dec. 30, 1884.
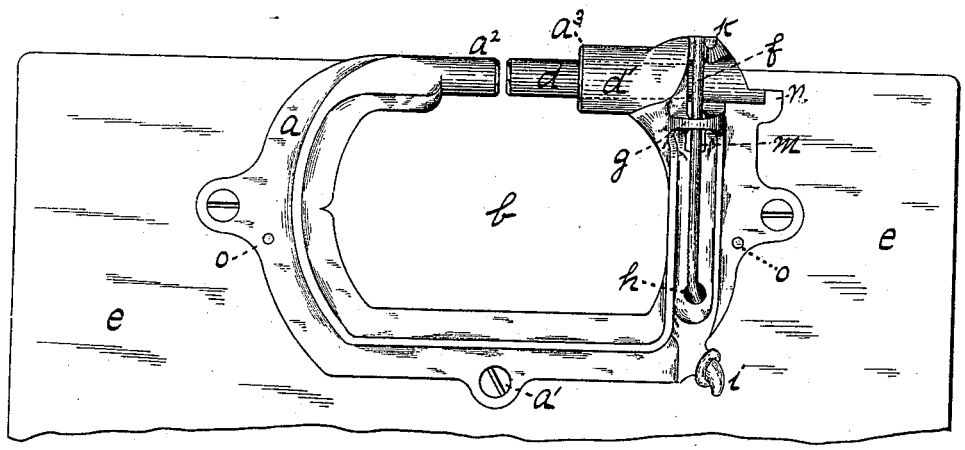
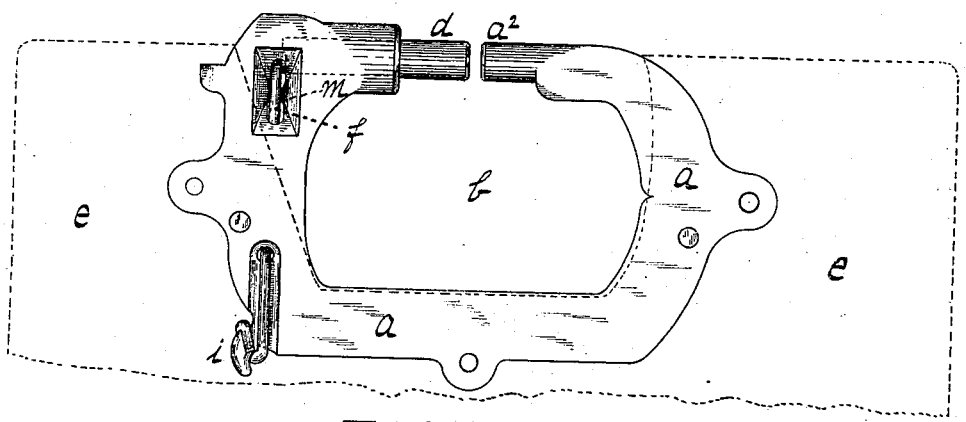
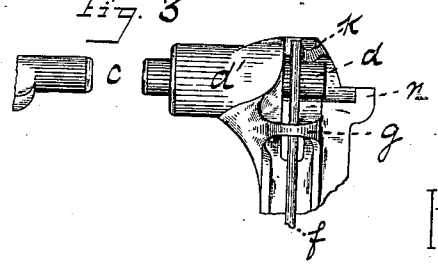
Witnesses.
J. A. Burus.
J. K. Smith.
Inventor:
Samuel Forrester
by his Attorneys
Bakewell & Kerr

United States Patent Office.

SAMUEL FORRESTER, OF ALLEGHENY, PENNSYLVANIA.

CALF-WEANER.

SPECIFICATION forming part of Letters Patent No. 309,843, dated December 30, 1884.

Application filed May 12, 1884. (No model.)

*To all whom it may concern:*

Be it known that I, SAMUEL FORRESTER, of Allegheny city, in the county of Allegheny and State of Pennsylvania, have invented a new and useful Improvement in Calf-Weaners; and I do hereby declare the following to be a full, clear, and exact description thereof, reference being had to the accompanying drawings, forming part of this specification, in which—

Figure 1 is a plan view of my improved calf-weaner. Fig. 2 is a similar view of the reverse side of a part of the same. Fig. 3 is a view of a section illustrating the manner of attaching the weaner to the calf.

My invention relates to an improvement in apparatus for securing plates or boards over the mouths of calves to prevent their sucking, in such manner that the calf may be free to eat, and that there may be no necessity for piercing its nostrils, or otherwise injuring it, in order to attach the plate.

In the drawings, $a$ represents the frame of my improved apparatus. It is preferably made of a hollow, elliptical, rectangular, or similar form, having an open space, $b$, in its center, and its periphery separated, as at $c$, so as to permit the weaner to be adjusted upon the calf's nostrils. A suitable bolt or dog, $d$, is mounted upon the frame $a$, preferably within the cylindrical way $d'$, so as to be capable of being moved across the space $c$. The frame $a$ is fastened suitably to a board or plate, $e$, by screws $a'$, or otherwise, and the plate is cut away, as at $b$, to correspond with the shape of the frame. By this means the cut in the plate $e$ is completely surrounded by the frame $a$, and is thereby made strong and not liable to split or break.

The operation of my improvement is as follows: The catch or dog is moved back in the ways $d'$, and the frame $a$ is adjusted so that the divided extremities $a^2$ $a^3$ of the frame may be on each side of the thin cartilage which separates a calf's nostrils. The dog $d$ is then pushed in the way $d'$ until it clamps this cartilage loosely between the dog and the end $a^2$ of the frame, and is secured there by a suitable catch, $f$. The dog and the end $a^2$ of the frame rest upon the thicker rib of flesh at the base of the nostrils, and suspend the weaner therefrom. By these means the plate $e$ is held securely upon the calf's nose and over its mouth without causing it pain, and while the calf can readily eat grass or drink water by pressing the end of the plate upon the ground, and thereby raising it upon the dog $d$ as an axis, it effectually prevents it from reaching the teats of a cow. The end of the dog $d$ and the extremity $a^2$ of the frame should be smoothed and rounded, so as not to lacerate the nostrils of the calf.

The arrangement of the catch $f$ is shown in detail in the drawings. It consists, preferably, of a spring-wire which extends at right angles to the dog or bolt $d$ along a side of the frame $a$, through a bridge, $g$, thereon, so that an extremity of the wire may rest across the outer opening of the groove or way $d'$. The other end of the wire is passed through a hole, $h$, in the side of the frame, and is thence bent upward and inward, so as to give the extremity which is opposite the groove $d'$ an outward-spring action away from the same and against the body of the frame $a$. This spring action is made permanent by twisting the wire about a lug, $i$, made on the frame, preferably on its outer periphery. A suitable lug or stop, $k$, limits the movement of the spring $f$ and holds it in position over the mouth of the groove $d'$. When the dog $d$ is in the position shown in Fig. 3, resting against the cartilage of the calf's nose, the weaner may be removed by pushing the spring-wire $f$ upward out of the path of the dog by a stick or rod inserted through a hole, $m$, made in the frame $a$ directly under the position of the wire. The dog is then moved in the groove under the raised catch $k$ and the weaner taken from the calf. To replace it the dog is moved inward in the groove until its outer extremity is out of the way of the catch, which then springs back into place and prevents the dog from jarring loose. A stop, $n$, is arranged at the outer extremity of the path of the dog, so as to prevent its being moved so far out of the cylindrical way $d'$ as to be liable to drop from the frame and be lost. It will be observed that as the action of the free end of the spring-catch $f$ is outward and away from the mouth of the way $d'$, it exerts no pressure upon the dog when the weaner is upon the calf's nose, but simply prevents its moving out of place, and that by varying the length of the dog the limits of its motion, when closed by the catch within the way $d'$, may be regulated to suit the thickness of the cartilage in the animal's nostrils. If desired, the outward-spring action of the extremity of the spring-wire $f$ may be disused, and the wire bent so that it may have only a downward spring against the frame $a$. I prefer to make the dog $d$ of such length that it and the end $a^2$ of the frame may exert little or no pressure upon the cartilage, but long enough that when in position it may rest and hang upon the enlarged rib at the base of the nostrils. The function of the bridge $g$ is to confine the wire spring $f$, and, as its sides afford a support for the wire, to limit its motion and prevent its being sprung, broken, or displaced by too great outward pressure.

Thus constructed the frame of the weaner can be readily cast in one piece of malleable iron or other suitable material. It is strong, easy of operation, harmless to the calf, and not liable to get out of order.

On account of its simplicity of construction my improved weaner can be manufactured and sold very cheaply. If desired, barbs or spikes $o$ may be fixed to the plate $e$, or to the frame $a$, so that the calf may be prevented from sucking by pricking the cow, and thus causing her to resist. In such case the plate $e$ may either be dispensed with entirely, or made proportionately much smaller than shown in the drawings. The frame $a$ should be so fixed to the plate $e$ that the center of gravity of the weaner may be in such place as to cause it to hang evenly and regularly from the calf's nose.

I am aware that calf-weaners having arms movable toward each other, so as to confine the cartilage of a calf's nostrils, and to suspend the weaners therefrom, are not new. In view of this I limit the scope of my claims to the fixed arrangement of the arms $a^2$ and $a^3$, one of them being provided with a sliding dog or bolt, $d$, mounted within one of the said arms, or in a groove or way on the same, and to the spring-catch $f$, with its accessories, whether in combination with said dog and arms or separate therefrom.

The advantages which I claim as resulting from the above-described construction of the dog $d$ and the arms $a^2 a^3$ are that by use thereof the weaner is made very strong and durable. I am also enabled therewith to use the spring-catch $f$, which is of great utility in the easy adjustment of the instrument, and in preventing unnecessary pain to the animal upon whose nostrils it is applied.

Having thus described my improvement, so that others skilled in the art to which it appertains may manufacture and use it, what I claim as my invention, and desire to protect by Letters Patent, is—

1. In a calf-weaner, the combination of the frame $a$, having opposite arms or extremities, $a^2 a^3$, separated so as to inclose the cartilage of a calf's nostrils, with a sliding bolt or dog, $d$, mounted on one of said arms, and movable thereon toward the other arm, so as to be capable of engaging said cartilage and of suspending the weaner therefrom, substantially as and for the purposes described.

2. In a calf-weaner, the combination, with the movable bolt or dog $d$, mounted within one of the separated arms or parts, $a^2 a^3$, of the frame $a$, of a movable catch, $f$, for securing said dog in position, said catch having a spring action away from said dog and against said frame, substantially as and for the purposes described.

3. The combination, with the sliding dog $d$, mounted within a groove or way in the frame of a calf-weaner, of the spring-wire $f$, capable of resting against said frame opposite to the opening of said groove or way, and of being forced away from the same in a direction at right angles to the line of said groove, substantially as and for the purposes described.

4. The combination, with the spring-catch $f$, for securing the movable dog or bolt $d$ within a calf's nostrils, of the bridge $g$ and lug $i$, or similar device, for securing and confining said catch and preserving its proper spring action, substantially as and for the purposes described.

5. In a calf-weaner, the combination of the movable dog or bolt $d$, mounted in a suitable groove or way, with a lug or stop, $m$, to limit the motion of said dog or bolt and prevent its being lost or displaced from the groove, substantially as and for the purposes described.

In testimony whereof I have hereunto set my hand this 7th day of May, A. D. 1884.

SAMUEL FORRESTER.

Witnesses:
W. B. CORWIN,
THOMAS W. BAKEWELL.